United States Patent [19]
Zhang

[11] Patent Number: 5,218,538
[45] Date of Patent: Jun. 8, 1993

[54] HIGH EFFICIENCY INPUT PROCESSING APPARATUS FOR ALPHABETIC WRITINGS

[76] Inventor: Wei Zhang, Room 13, 13th Building, Western Block, 1 Yiguangsi Xianghonggi, Haidian District, Beijing 100091, China

[21] Appl. No.: 723,160

[22] Filed: Jun. 28, 1991

[30] Foreign Application Priority Data

Jun. 29, 1990 [CN] China .................................. 90103146
Sep. 10, 1990 [CN] China .................................. 90107494

[51] Int. Cl.⁵ ........................ G06F 15/38; H03M 1/22
[52] U.S. Cl. ...................................... 364/419; 341/22
[58] Field of Search ............... 364/419, 943.41, 936, 364/226.4, 928.6; 341/22; 340/98, 99, 100, 486

[56] References Cited

U.S. PATENT DOCUMENTS 3,944,042  3/1976  Gremillet .............................. 400/99
4,773,009  9/1988  Kucere et al. ...................... 364/419

FOREIGN PATENT DOCUMENTS 0243188  10/1987  European Pat. Off. .
0373319  6/1990  European Pat. Off. .

Primary Examiner—Roy N. Envall, Jr.
Assistant Examiner—Khai Tran
Attorney, Agent, or Firm—Sughrue, Mion, Zinn, Macpeak & Seas

[57] ABSTRACT

Literal units which correspond to a code of characters of a key unit input on a keyboard are stored in a literal unit library which is accessed by a key unit library when it is determined that the entire key unit has been input. A synonym selection module is provided to retrieve a unique literal unit when more than one literal unit corresponds to the key unit entered. The encoding process provides for faster and more efficient input of information on a keyboard since it is only necessary to input a code of characters referred to as the key unit, such as the consonants of the particular text, to retrieve the desired text from the literal unit library where the literal unit includes characters which default in the key unit.

34 Claims, 5 Drawing Sheets

FIG. 3

| ESC | 1 | 2 | 3 | 4 | 5 | 6 | 7 | 8 | 9 | 0 | - | = |
| --- | --- | --- | --- | --- | --- | --- | --- | --- | --- | --- | --- | --- |
| | Q -EST | W -WARD | E -ENCE | R -ER | T -TION | Y DIS- | U -OUS | I COM- | O -OLOGY | P -SHIP | [ | ] |
| | A -ANT | S -IST | D -DOM | F -FUL | G -AGE | H -TH | J INTER- | K -LIKE | L -LESS | ; | ' | |
| | Z -IZE | X STR- | C -ANCE(Y) | V -TIVE | B -ABLE | N -NESS | M -MENT | , | . | / | | |

FIG. 4

| ESC | 1 | 2 | 3 | 4 | 5 | 6 | 7 | 8 | 9 | 0 | - | " |
|-----|---|---|---|---|---|---|---|---|---|---|---|---|
| | | A<br>-ANCE | Z<br>-ESSE | E<br>-ENCE | R<br>-AIRE | T<br>-TION | Y<br>-AILLE | U<br>-EUR | I<br>INTER- | O<br>-OIRE | P<br>-PHONE | |
| | | Q<br>-IQUE | S<br>-ISTE | D<br>-ARD | F<br>PHONO- | G<br>-AGE | H<br>SUPER- | J<br>-SUR- | K<br>-SUR- | L<br>-LOGUR | M<br>-MENT | |
| | | W<br>AINE- | X<br>EXTRA- | C<br>CONTRE- | V<br>COM- | B<br>-BLE | N<br>-AISON | , | . | / | | |

FIG. 5

| ESC | 1 | 2 | 3 | 4 | 5 | 6 | 7 | 8 | 9 | 0 | - | = |
|---|---|---|---|---|---|---|---|---|---|---|---|---|
| | Q -IGKEIT | W -WERT | E -ER | R -SAM | T -TION | Z -ENZ | U -UNG | I -LOUR | O -SEITIG | P -ARTIG | Ü -REICH | |
| | A -ANER | S -SCHAFT | D DURCH- | F -HAFT | G -LING | H -HEIT | J -LEER | K -KEIT | L -LER | Ö -VOLL | Ä -NAR | |
| | Y -LICH | X -IGEN | C -CHEN | V VER- | B -BAR | N -NER | M -MALS | , | . | / | | | |

HIGH EFFICIENCY INPUT PROCESSING APPARATUS FOR ALPHABETIC WRITINGS

FIELD OF THE INVENTION

The present invention relates to an input processing apparatus for computers and word processing machines, an particularly relates to a high efficiency input processing apparatus for alphabetic writings.

BACKGROUND OF THE INVENTION

The amount of various literal information processing increases rapidly along with the development of society and culture; accordingly, the speed of word processing by computers and word processing machines has been improving constantly. In all respects, the existing input apparatus and method of computers and word processing machines have become inadequate to meet the demand. The input method and apparatus for alphabetic writings still adopt inputting with one key to one character or letter correspondence, the work load of input is tremendous, and the speed can hardly be improved.

A keyboard input system for alphabetic writings has been disclosed by the European Patent EPO-A2-0243188, which proposed a scheme of striking multiple keys simultaneously to expedite the input speed, however, since the keyboard and method employed by this technique has changed the traditional operating fingering, it made it difficult for the operator to learn and it required special training. Because when inputting, it is possible to strike several adjacent keys concurrently, but it is difficult to strike a number of dispersed keys, while the alphabetic arrangement of words varies tremendously, neither common keyboard nor special keyboard could ensure the arrangement of the letters conforming to the arrangement of the keys of the keyboard, furthermore, the error rate of the input method of striking several keys simultaneously is relatively high. In addition it has been proved in practice that it is extremely difficult to persuade people to spend great efforts to learn to use a new keyboard and fingering.

The object of the present invention is to provide a high efficiency input processing apparatus for alphabetic writings, so that the operator may input literal information with more characters by striking less keys, thereby, breaking the traditional input method of one-one correspondence of keys and characters of alphabetic writings, so as to significantly improve the input efficiency, as well as to reduce the work load of operators, whereas, the system of the present invention may reserve the traditional fingering and arrangement of keyboard to facilitate learning and manipulation. The present invention provides a fuzzy dictionary at the same time.

SUMMARY OF THE INVENTION

The basic idea of the present invention is to encode literal units of alphabetic writing, i.e. words, terms, phrases, and even paragraphs of text etc., in accordance with a set of definite rules, so that a literal unit including more characters corresponds to a code including less characters, and the literal units are stored in a literal unit library storage; when a literal unit is to be input, only its corresponding code is needed to key in on the keyboard, and the literal unit to be input can then be found and fetched from the literal unit library storage through the processing of a special system, thereby, fulfilling the input of this literal unit. Thus, an ordered combination of a set of keys on the keyboard, which is referred to as a key unit, corresponds to a literal unit including more characters in the literal unit library. Since the encoding method according to the idea of the present invention is to omit certain specific letters, e.g., the vowels etc., in the literal units such as words, phrases and so on, therefore, the codes of the literal units according to the idea of the present invention are of straight forward association with the literal units per se; while the processing of synonyms generated are also straight forwardly associated with the literal units per se, e.g., by the complementing of one or more omitted characters; therefore the codes according to the idea of the present invention require no special learning and memorization.

The high efficiency input processing apparatus for alphabetic writings according to the present invention is an apparatus embodying the above idea.

The high efficiency input processing apparatus for alphabetic writings according to the present invention, includes a:

keyboard, for inputting literal information or instructions;

literal unit library, for storing literal units of words, terms, phrase, paragraphs of texts and the like; a set of keys composed in accordance with certain order on the keyboard, i.e., a key unit, corresponds to a specific literal unit in the literal unit library;

determination processing means, including a key unit termination determination module for determining whether the signal of a key unit is terminated, and a synonym selection module, for determining and selecting a unique literal unit where a key unit corresponds to more than one literal unit in the literal unit library; and key unit means, for receiving the signal of each key unit from the keyboard, and retrieving the corresponding literal unit from the literal unit library according to the input key unit.

The key unit includes a key indicating the termination of the key unit and being used by the key unit termination determination module to determine whether a key unit is terminated; the key unit corresponding to a literal unit in the literal unit library defaults the keys corresponding to a portion of certain specific characters in the literal unit.

When a literal unit in the literal unit library is a word, then the corresponding key unit has defaulted the keys corresponding to the vowels and semivowels in the literal unit, as compared with the literal unit.

Where a literal unit in the literal unit library is a term or phrase or paragraph of a text, the key unit corresponding to the literal unit is composed of the corresponding keys on the keyboard of one or more consonants of one or more constituent words of the literal unit.

The key unit corresponding to a literal unit in the literal unit library is composed of the corresponding keys on the keyboard of a portion of consonants of each consonant portion separated by each vowel or consecutive vowels in the literal unit.

The key unit corresponding to a literal unit in the literal unit library is composed of the corresponding keys on the keyboard of the first consonant of each syllable in the literal unit.

If an ordered combination of the keys on the keyboard including a terminating indicator key corresponds to more than one literal unit in the literal unit library, then the key unit uniquely corresponding to one of these literal units is the above mentioned ordered combination of keys plus a portion or all of the characters defaulted in the ordered combination of keys as compared with the literal unit, or numeric keys, or upper case alphabetic keys, or punctuation keys, or the space bar.

The vowel keys and/or the space bar and/or the punctuation keys and/or upper case alphabetic keys and/or the numeric keys and/or the specific consonant keys on the keyboard are defined as function keys, e.g. affix keys, mode converting switch keys, terminator keys for key units, synonym selection keys, high frequency word keys, etc., in high efficiency input mode.

The key units composed, according to certain order, of an alphabetic key and a vowel key or numeric key or punctuation key or upper case alphabetic key or the space bar on the keyboard, and the key units composed, according to certain order, of any two of the above mentioned five kinds of keys are used as simplified codes of some of the literal units in the literal unit library, corresponding to those literal units.

The determination processing means further includes a mode determination module, for determining whether the information input with normal mode or information corresponding to the key unit input with high efficiency mode, and this module includes at least one input mode nonautomatic determination submodule, for determining whether the input information is information input with normal mode or high efficiency mode according to a switch signal before the information input.

The mode determination module further includes an input mode automatic determination submodule, for automatically determining whether the input information is information corresponding to the key unit input with normal mode or high efficiency mode according to whether the input information is a specific combination of character or contains special information.

BRIEF DESCRIPTION OF THE DRAWINGS TABLES

FIG. 3 is a schematic diagram of a keyboard of the present invention, where the upper case alphabetic keys are used as prefix and suffix keys for inputting English;

FIG. 4 is a schematic diagram of a keyboard of the present invention, where the upper case alphabetic keys are used as prefix and suffix keys for inputting French;

FIG. 5 is a schematic diagram of a keyboard of the present invention, where the upper case alphabetic keys are used as prefix and suffix keys for inputting German;

Table 1 lists the combinations of letters that never or scarcely appear at the first two positions of words in certain languages.

Table 2 is the practical scheme of the simplified code key unit composed of an alphabetic key and a numeric key according to the preferred embodiment of the present invention.

Table 3 is the practical scheme of the simplified code key unit composed of an alphabetic key and a punctuation key according to the preferred embodiment of the present invention.

DETAILED DESCRIPTION OF THE INVENTION

The high efficiency input processing apparatus for alphabetic writings of the present invention has established a correspondence between the ordered combinations of one or more keys on the keyboard, i.e., key units, and the literal units, e.g. words, terms, phrases, and even paragraphs of text, etc., with the number of keys of a key unit less than or at most equal to the number of characters of its corresponding literal unit, thus, in the inputting of a literal unit, it requires only to strike the corresponding key unit on the keyboard, thereby, reducing the work load of input.

Figure 1:
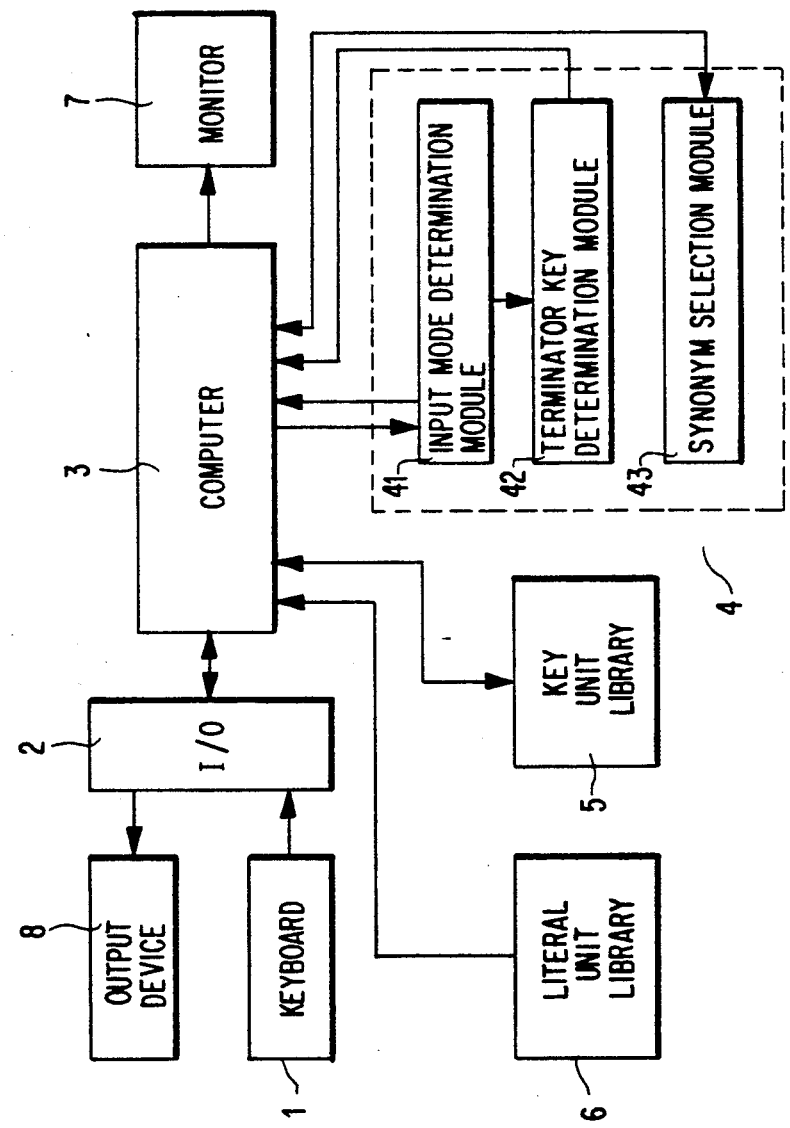
FIG. 1 is a schematic block diagram of the apparatus of the invention.

Referring to FIG. 1, the input processing apparatus for alphabetic writings of the present invention includes a:

keyboard 1, for inputting characters and commands;
an I/O interface means 2;
a computer 3, for controlling the operation and execution of the whole system;
a determination processing means 4 for analyzing and processing information of the input key unit;
key unit means 5, for storing the electrical signal information of various possible key units of the present invention;
literal unit library 6, wherein, a plurality of literal units, such as words, terms, phrases, or paragraphs of text, are stored.

FIG. 1 illustrates a monitor 7, printer or laser printer or other peripherals 8.

The determination processing means 4 includes an input:

mode determination module 41, for detecting the signals input via the keyboard to determine whether the signals are input with the normal mode or high efficiency input mode. Of course, this module 41 is not necessary where high efficiency input mode is definitely adopted without the consideration of consistency with the normal input mode.

Terminator key determination module 42 is provided for recognizing the signals input with high efficiency mode to identify a signal generated by a terminating indicator key of a key unit, so as to make a decision of whether the signals corresponding to a key unit are terminated.

A synonym selection module 43 is provided for the situation where a key unit is terminated and there are more than one corresponding literal units in the literal unit library 5, then a sound is generated by a synonym indicating means (not shown) to prompt the operator to further input synonym selection signal, which is detected and determined by the synonym selection module to select a unique literal unit.

The operating process of the apparatus of the present invention is as follows: information is input on the keyboard by the operation, which is then analyzed and processed by the determination processing means 4 of the present invention under the control of the computer 3. The information is analyzed and processed by the input mode determination module 41 to determine whether the information signals are signals input under the normal input mode or signals corresponding to key unit input under high efficiency input mode. This process is unnecessary in the embodiment of the present invention where consistency with the normal input mode is not taken into consideration.

Under the situation where consistency is taken into consideration, the input mode determination module 41 is further divided into two submodules, i.e., an input mode automatic determination submodule and an input mode nonautomatic determination submodule. Wherein, the latter is always necessary for consistent input, while the former is a further improvement to the consistent input.

The input mode nonautomatic determination submodule determines whether the signals are input in the normal mode or in the high efficiency mode by the status of a specific input mode converting switch, this input mode converting switch is set by signals corresponding to certain specific key or key units on the keyboard, for example, the striking of the space bar succeeding terminator key or the repeated strikings of a of certain key. This submodule of the present invention enables consistent input of high efficiency and normal modes.

In addition to the differentiation of input modes with the input mode converting switch keys, the present invention may further provide an input mode automatic determination submodule to differentiate the input modes. This submodule performs determinations in accordance with the regulations of the key units of the present invention. For example:

According to the key unit of the present invention, certain specific characters should not occur on certain positions, e.g., vowel character key shall not appear on the first key position, if the first character of the input information is a vowel letter, then the submodule can determine that the information is input in the normal mode.

According to the rules of alphabetic writings, certain combinations of letters will not appear in words. For example, none or nearly none of the English words begins with the combinations of two letters listed in the English part of Table 1, while the first two letters of the key units of the present invention include these combinations, therefore, where the first two letters of the input information are those combinations, the information of the key unit is determined by the input mode automatic determination submodule as being input in the high efficiency input mode. As for other alphabetic writings, there are also specific combinations facilitating the determination with the above mentioned method. Of course, some of the information can not be determined merely by the first two letters, for example the first two keys are "st" in English, but if the first three letters are "stn", it can be determined that the information is of the key unit of high efficiency input mode, else if the first three letters are "str", then the fourth letter is required in the determination.

If an upper case letter occurs on the second or latter positions of certain input information, then it can be also determined by the input mode automatic determination submodule that the information is of the key unit of high efficiency input mode.

In summary, there are also other similar rules, based on which the input mode automatic determination operates to make determinations.

Figure 2:
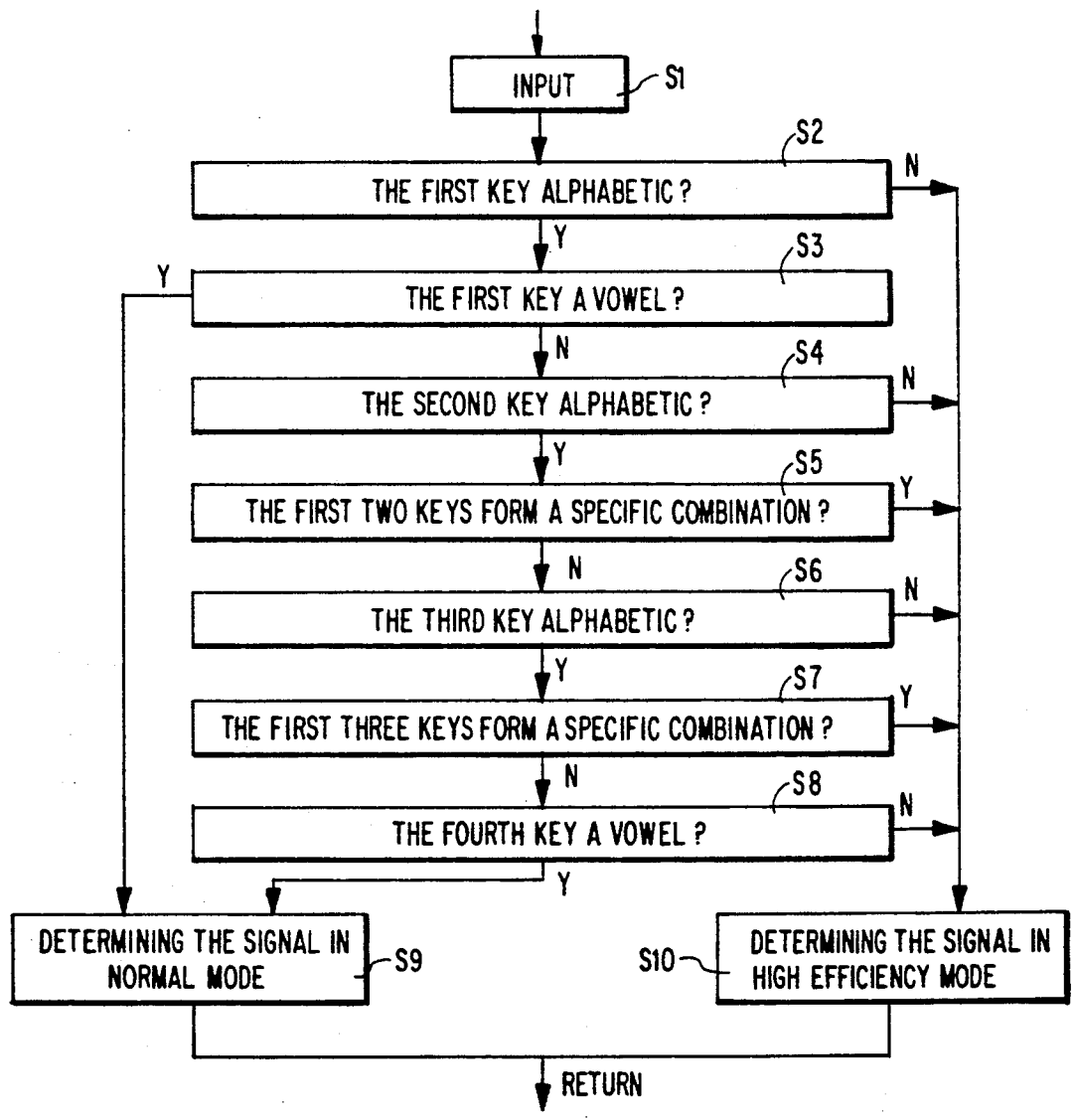
FIG. 2 shows the flowchart of the input mode automatic determination submodule of the present invention.

FIG. 2 shows a flowchart of the input mode automatic determination submodule, wherein, the said specific combinations of the first two, three or four keys refer to letter combinations which do not or hardly ever occur on the first two, three or four positions of a word of a certain writing, the specific combinations of the first two letters of a word for certain writings are given in Table 1.

The input mode automatic determination submodule is aimed at further improving the efficiency of consistent input, and it is optional for consistent input. If difficulty is encountered in the determination of this submodule in certain special situations, what is required is only to switch the information of the converting switch key to the nonautomatic determination submodule.

Once the input mode is determined, if it is in the normal input mode, then the termination processing means 4 notifies the computer 3 and operates in the normal mode in subsequent operations, if it is in the high efficiency mode, then the next step is to determine whether there has been a signal generated by the terminator key of the key unit in the input information by the terminator key determination module 42. The terminator keys of the key unit of the present invention may be functioned by certain specific keys, which will be described later. When the module 42 identifies the information of a terminator key, it notifies the computer that a key unit has been terminated.

In the next step, the computer notifies the key unit means 5 to find out and fetch the corresponding literal unit of the input key unit from the literal unit library 6. A key unit vocabulary table is provided in the key unit means 5, the various permissible key units of the present invention are stored therein, for example, the key unit vocabulary "cmnct" corresponding to the literal unit "communicate", each key unit vocabulary corresponds to the address of a literal unit in the literal unit library. When a key unit signal has been received by the key unit means 5, this key unit vocabulary is retrieved from the key unit vocabulary table and the address of the corresponding literal unit is found, and, in turn, this literal unit can be fetched from the literal unit library, thus, the input of a literal unit is fulfilled.

If there are more than one literal units correspond to one key unit, that is to say, where synonyms occur, a prompting sound is sounded by a synonym indicating means, at that time, the operator inputs further synonym selection signals, then the synonym selection module 43 performs the selection determination under the control of the computer and notifies the computer 3 select the correct literal unit. The synonym selection mode and specific synonym selecting keys of the present invention will be described later.

The foregoing has described the procedure of the corresponding of the key units with the literal units in the literal unit library. The following is a description of the alternative correspondences between the key units and the literal units of the present invention.

There are specific regulations for the key units of the present invention in general, that is, some specific keys are allowed to present at least one position while other specific keys are not allowed, only those ordered combinations of set of keys conforming to this regulation are considered as key units, in addition, each key unit shall have a terminator key.

The specific alphabetic keys not appearing in each of the above key units correspond to the default characters of the literal unit in the literal unit library corresponding to this key unit.

The specifically expelled keys of the key units of the present invention are the vowel alphabetic keys, in other words, or on at least one position of the key units, it is regulated that only those keys other than the vowel letters specifically expelled could occur. A correspondence between the key units of the present invention and their corresponding literal units is that the key units omit the keys corresponding to the vowels or semivowel of their corresponding literal units. Taking English as an example, the key unit corresponding to a literal unit omits the keys corresponding to "a, e, i, o, u" and "y" in that literal unit, For example: the corresponding key unit for "government" being "gvrnmnt␣";

the corresponding key unit for "democratic" being "dmcrtc"; and the corresponding key unit for "weapon" being "wpn".

Another example for spanish is as follows: the corresponding key unit for "bonra" being "bnr"; and the corresponding key unit for "cterno" being "ctrn".

It is also adaptable to languages other than the Latin, for example: in Greek, the corresponding key unit for "παpa" being "πP";

In Bulgarian, the corresponding key unit for "TPAIIA" being "TPII".

In Russian, "HEσA"-"Hσ"

The present invention is adaptable to all alphabetic writings, therefore, only a description of the English language as an example will be given in the following, which is also fully adaptable to other writings.

The correspondence between the key units of the present invention and the literal units may also be as follows:

The first position of a key unit could be any keys including the vowels, for example: the corresponding key unit for "about" being "abt".

This correspondence is for reducing some of the synonyms, however, the first position may also not be a vowel key, for example, in the case of consistent mode of high efficiency input with normal input, the first position may not be a vowel key.

The correspondence between the key units of the present invention and the literal units may be of the following mode:

Regarding a literal unit, e.g., a word, as being constituted by different portions separated by vowel, or regarding a word as interleaving portions of consonants and vowels, the key unit corresponding to this literal unit can be constituted by taking the keys corresponding to one or more consonants of each of the consonant portions, for example:

the corresponding key unit for "government" being "gvmt␣", where each of the consonants preceding a vowel as well as the last letter are selected, a further example:

the corresponding key unit for "government" being "gvrnt␣", where each of the consonants succeeding a vowel are selected, of course, the first and the last consonants are also included in this example.

The key units of the present invention and the literal units may also be mapped in the following correspondence mode:

the corresponding key unit can be constituted by the corresponding keys of the first consonant of each of the syllables of the word, for example:

the corresponding key unit for "capability" being "cpblt␣".

The key units of the present invention can be mapped to the literal units in the following correspondence mode:

if a literal unit is ended by a vowel (or semivowel), its corresponding key unit may also include the key corresponding to that letter to reduce synonyms, for example: the corresponding key unit of "capability" being "cpblty".

The following is another correspondence mode for the key units of the present invention and the literal units:

The key unit may also reserve the key corresponding to the last consonant of its corresponding literal unit to reduce synonyms for example:

the corresponding key unit for "comparing" being "cprg".

The following is yet another correspondence mode of the key units of the present invention and the literal units:

certain specific consonants in a literal unit, e.g., the keys corresponding to the silent letters or letters pronounced together with a vowel, may be omitted in the key unit corresponding to that literal unit, for example:

where "er" is pronounced as a vowel, the key corresponding to "r" may be omitted;

where multiple consonants are pronounced as a single phoneme, they can be omitted, for example:

the key corresponding to the "h" in "ch, sh, th, ph, gh" can be omitted;

the keys of adjacently repeated consonants in certain words can be reduced to one of the corresponding keys, for example:

the corresponding key unit for "dinner" being "dnr␣", wherein only one "n" key is reserved.

Where the literal unit is a phrase, the keys corresponding to at least the first consonants of the constituent words are taken to constitute the key unit corresponding to that literal unit, for example:

the corresponding key unit for "last week" being "lw";

the corresponding key unit for "such as" being "ss";

the corresponding key unit for "go up" being "gp";

the corresponding key unit for "the number of" being "tnf"; and the corresponding key unit for "went on" being "wn".

Where the literal unit is a phrase, the keys corresponding to one or more consonants of the constituent words are taken to constitute the key unit corresponding to that literal unit, for example the corresponding key unit for "last week" is "lstwk".

Since some of the keys are specified as specifically omitted keys in the key units by the present invention, these keys can be defined as special function keys, they are of special effects in the apparatus of the present invention.

These function keys comprise:

(1) Terminator keys of key units for indicating the termination of the key units;

(2) Affix keys, corresponding to the prefixes, suffixes or roots of literal units;

(3) Mode converting switch keys, for use in the conversion of two different modes, if required, for example, for setting the input mode switch for differentiating whether it is in normal input or high efficiency input by the system;

(4) Synonym selection keys, for selecting synonyms where the corresponding literal units of a key unit are not unique; and (5) High frequency word keys, corresponding to certain high frequency words in the literal library, to further expedite the input of these words.

The keys that can be defined as special function keys in the present invention include:

(1) alphabetic keys specifically expelled from the key units, such as the vowel keys, (2) numeric keys, (3) punctuation keys, (4) the space bar, (5) upper case alphabetic keys, and (6) other specific consonant keys. They are explained by examples respectively as follows:

(A) The vowel keys used as function keys:

1. The vowel keys used as terminator keys, for example:

the corresponding literal unit for key unit "cmncto" being "communicate", in the key unit "o" is the terminator key.

2. The vowel keys used as prefix and suffix keys, for example:

the literal unit corresponding to key unit "gvru" being "government", in the key unit "u" is a suffix key which stands for "ment";

3. The vowel keys used as synonym selection keys, for example:

Words "petinod" and "petined" correspond to the same key unit "ptnd⎵", where "⎵" is used as the terminator key, when "ptnd⎵" is input, synonyms will occur, and the synonym indicating means will generate a sound to prompt the operator, it is still unable to differentiate the synonyms while the synonym selection keys "e" and "i" are keyed in, only when the further keys "o" or "e" are keyed in could the first word or the second word be finally selected.

4. The vowel keys can be used as high frequency keys, for example:

the key unit "o" corresponds to literal unit "of", since the frequency of use of "of" is very high, therefore, if "o" is defined as the corresponding key unit for the high frequency word "of", the input efficiency can be improved.

(B) Upper case alphabetic keys used as function keys:

1. Upper case alphabetic keys used as terminator keys, for example:

the corresponding literal unit for key unit "cM" being "come", in the key unit "M" is used as the terminator key;

2. The upper case alphabetic keys used as the prefix and suffix keys, for example:

the corresponding literal unit for key unit "gvrM" being "government", in the key unit "M" is used here as the suffix key standing for "ment";

3. The upper case alphabetic keys used as high frequency word keys, for example:

defining the key "O" to correspond to literal unit "of", the key "T" to correspond to the literal unit "the".

(C) Punctuation keys used as function keys:

1. The punctuation keys used as terminator keys, for example:

the key unit "cmnct", corresponds to literal unit "communicate", where the key "," is a terminator key of the key unit;

2. The punctuation keys used as prefix and suffix keys, for example:

the key unit "gvr," corresponds to literal unit "government" where the key "," is used as the suffix key standing for the suffix "ment".

3. The punctuation keys used as mode converting switch keys, for example:

in the key unit "gvr,,", the repeated "," is used as the mode converting switch key.

4. The punctuation keys used as synonym selection keys, for example:

when the key unit "thm" is keyed in, there are corresponding literal units "them" and "theme", if it is regulated that the keying in of a punctuation ",", then the word "them" having the higher frequency in use will be selected, thereby, "," is used as the synonym selection key.

(D) The space bar used as function keys:

1. The space bar used as the terminator key, for example:

the key unit "cmnct⎵" corresponds to literal unit "communicate", where "⎵" is used as the terminator key.

2. The space bar used as prefix and suffix keys, for example: the key unit "gvr⎵" corresponds to "government", where "⎵" is used as the suffix key standing for "ment".

3. The space bar used as the mode converting switch key, if the space bar is striken after the termination of inputting a key unit, the space bar is regarded as the converting switch key, for example:

the key "⎵" in "gvrM⎵" is the converting switch key.

4. The space bar used as synonym selection keys, for example:

the key unit "thm" corresponds to literal unit "them" and "theme", if it is regulated that "thm" corresponds to "them" having the higher frequency in use, then synonym selection can be fulfilled.

(E) The numeric keys used as function keys:

The use of numeric keys as terminator keys and prefix and suffix keys is similar to that of the punctuation keys, it will not be repeatedly described here. They can also be used as synonym selection keys, for example:

the keying in of "thm" corresponds to literal units "them" and "theme", while "1" or "2" is further keyed in, then "them" or "theme" is selected respectively, thereby, synonym selection is fulfilled.

The numeric keys may also be used as the keys for high frequency words, for example, we may specify:
"1"—"a", "2"—"on", "3"—"that", "4"—"in", "5"—"the", "6"—"and", "7"—"to", "8"—"for", "9"—"be", and "0"—"of", of course, other correspondences for the ten high frequency words are also possible.

In fact, when certain specific alphabetic keys of the present invention are used as one kind of function key, they may concurrently be used as another kind of function key, thus, further reducing the number of keys keyed in, for example, the prefix and suffix keys may concurrently be used as terminator keys, for example:

"u" in "gvru"—"government";
"M" in "gvrM"—"government";
"," in "gvr,"—"government";
"⎵" in "gvrt⎵"—"government"; and
"8" in "gvrt8"—"government".

The high frequency word keys used concurrently as terminator keys, for example:

provided that key "O" corresponds to "of" and "T" corresponds to "the", then key unit "bnkO" corresponds to literal unit "bank of", where "O" is used concurrently as terminator key and high frequency word key, and key unit "withT" corresponds to literal unit "with the", where "T" is used concurrently as terminator key and high frequency word key.

The prefix and suffix keys provided by the present invention can both correspond to grammatical prefixes and suffixes as well as roots of words. There are many roots, prefixes, and suffixes in alphabetic writings, they are usually composed of more than one letter, therefore, it contributes to improve input speed where prefixes, suffixes and roots of words are corresponded with less keys; in addition, grammatical conversions are converted through the changing of suffixes, if certain specific keys are specified as grammatical suffix keys, where a combination of keys corresponding to a word are input together with a suffix key, the correct conversion form can be automatically found in the literal unit library, it is undoubtedly of significant help to remedy the prefix and suffix or grammatical conversion in daily literal applications.

Specific determinations have been regulated in the apparatus of the present invention, at the same time, special regulations are stipulated internally, where a prefix or suffix key occur at the end of a key unit, automatic recognition is performed by the system and the correct literal form is fetched from the literal unit library. The prefix and suffix function keys may correspond to any prefixes, suffixes or roots of words.

Where an affix key corresponds to the prefix of a literal unit, then the combination of keys corresponding to the portion of the literal unit succeeding the prefix are input first, and then the prefix key is attached to the end of the combination of keys to form the key unit corresponding to this literal unit, as for the suffix keys, they are naturally at the end of the key units, for example:

In English:
key unit—literal unit
"vwJ"—"interview", the upper case alphabetic key "J" corresponding to prefix "inter" and functioning concurrently as the terminator key;

"cvrY"—"discover", the upper case alphabetic key "Y" corresponding to prefix "dis";

"mvM"—"movement", where the upper case alphabetic key "M" corresponding to suffix "ment" and functioning concurrently as terminator key; and "gC"—"geology", where the upper case alphabetic key "C" corresponding to suffix "ology" and functioning concurrently as terminator key.

In France:
key unit—literal unit
"rdnrX"—"extraordinaire", where the upper case alphabetic key "X" corresponding to prefix "extra" and functioning concurrently as the terminator key;

"ntnlI"—"international", where the upper case alphabetic key "I" corresponding to prefix "inter" and functioning concurrently as the terminator key;

"pnT"—"punition", where the upper case alphabetic key "T" corresponding to suffix "tion" and functioning concurrently as the terminator key.

In German:
literal unit—key unit
"verfilmen"—"flmnV", where the upper case alphabetic key "V" corresponding to prefix "ver" and functioning concurrently as the terminator key; and "unglaublich"—"nglbY", where the upper case alphabetic key "Y" corresponding to the suffix "lich" and functioning concurrently as the terminator key.

FIGS. 3, 4, and 5 show respectively the schematic diagrams of key boards used for inputting English, French, and German, where the upper case alphabetic keys being used as affix keys.

The providing of affix keys by the present invention further compresses the number of keys of key units, increases the input speed, as well as reduces synonyms.

In the present invention, the occurrences of upper case letters on positions other than the first position are stipulated as special function keys, in fact, when a segment of information is input from the keyboard, whether an upper case letter appears on a position other than the first key can be used as an indication to determine whether the current input mode is high efficiency input mode by the above mentioned input mode determination module.

The key units of the present invention omit the keys corresponding to the vowels or other letters in their corresponding literal units, therefore, synonyms may be generated under certain conditions, that is, the correspondence between the key units and the literal units in the literal unit library is not one-one, a key unit may correspond to more than one literal units, thus, selection is necessary.

One method of the present invention for selecting synonym is to supplement the strikings of a portion or all of the omitted vowels or other letters, letters shall be supplemented until there is no synonym, for example:

When the key unit "st" is keyed in, its corresponding literal units are "sat" and "sit", either "set" or "sit" can be selected by supplementing "e" or "i"; and both "petinod" and "petined" corresponding to the key unit "ptnd⊔", selection still can not be made by successively inputting "e" and "i", only when "o" or "e" is keyed in could the word "petinod" or "petined" be selected respectively.

It is most straight forward to perform synonym selection by supplementing omitted letters once the synonym prompting means indicates the occurrence of synonyms, the operator may key in synonym selecting signals without watching the screen, thus, even the monitor is not necessary.

Especially, when the synonym selection and terminator keys are used in combination or concurrently, then synonyms can be reduced, or both the objects of synonym selection and key unit termination can be achieved concurrently, for example:

The key unit "st⊔" corresponds to literal units "set" and "sit", where the ⊔ is the terminator key, "e" or "i" shall be keyed in for synonym selection. If "ste" or "sit" is keyed in, then the corresponding literal unit "set" or "sit" can be found directly, here "e" and "i" function as terminator key and synonym selection key concurrently. Of course, the "e" or "i" here is not used to select synonym after the occurrence of the synonym, but synonym is avoided when either one of them has been keyed in. This is very easy and natural for the operators after they have familiarized themselves with the system of the present invention. Using the latter input key unit to find the corresponding literal unit can be reduced by one key than the former. What should be pointed out is that the former method does not increase by one key than the normal mode, since in the normal mode, a space is needed after the inputting of each word, while inputting with key units the space as delimiters of words is not necessary.

The synonym selection keys provided by the present invention may also be the numeric keys, upper case alphabetic keys, punctuation keys or other alphabetic keys. Of course, the present invention also permits intelligent synonym selection, for example, synonyms can be selected according to context relationships, grammatical modes and morphological features.

When different kinds of keys are used in synonym selection, they can achieve overlapped synonym selection, of course, separated synonym selections are also possible. When two or more kinds of keys are used in synonym selection, they can be supplemented by each other while one kind is unfavorable.

If a key unit corresponds to
1"sat", 2"set", 3"sit", 4"sut", each word corresponding to a specific numeric key can be selected respectively through the numeric keys "1", "2", "3", and "4", while the vowel keys "a", "e", "i", and "u" may also be used to select the above words respectively. Thereby, the operator can select with blind striking or prompting selection as to facilitate synonym selection.

We may further define a juxtaposed kind of synonym selection keys, permitting this kind of synonym selection keys can still be used while reserving the other kinds of synonym selection keys. For example, the space bar or the key ",", or other keys are defined as the first position synonym selection keys to select the literal unit arranged in the first position of the system in a plurality of literal units corresponding to a single key unit. This is of significance in practice, the literal unit thus selected is the one of highest frequency in use.

It should also be pointed out that when synonyms are selected with the omitted alphabetic keys, or the terminator keys are the omitted alphabetic keys, e.g. the vowel keys, keys either in the front, middle or at the end of a literal unit can be used therefor. For example, the key unit "mvmnte" uses the last vowel of the corresponding literal unit as the synonym selection key. Sometimes, this might make the selection of synonym relatively easy.

Where the numeric keys of the present invention are used as high frequency word keys, from the view of psychological engineering, it should be considered that the keys arranged in the central portion of the keyboard may be easier to operate than those arranged on two sides, therefore, it may be desirable to define the keys easy to operate as the highest frequency word key. In English, the numeric keys can be defined to correspond to at least one or several of the literal units "the", "a", "of", "in", "to", "for", "be", "on", "that" and "and". Similar regulations can also be made for other languages.

Some of the literal units in the literal unit library of the present invention also correspond to key units composed of two keys on the keyboard, these key units may be used as simplified codes corresponding to those literal units, for example:

The key corresponding to the first letter of a literal unit and the key corresponding to a vowel of the literal unit constitute the key unit corresponding to that literal unit. It should be noticed that in the consistent mode of high frequency and normal input, these key units of simplified codes in which the second key is a key corresponding to a vowel are not allowed.

The key corresponding to the first letter of a literal unit and a numeric key or punctuation key or the space bar constitute the key unit as simplified code corresponding to that literal unit, for example:

The key unit "W1" corresponding to "with";
the key unit "W2" corresponding to "was"; and
the key unit "W," corresponding to "whether".

In addition, certain key units are also provided by the present invention, which are constituted by any two of, for example, the numeric keys, punctuation keys and the space bar, as well as key units of the specific combinations of two of certain specific keys. The above mentioned key units correspond to literal units having specific addresses in the literal unit library as the simplified code of these liberal units.

Since the key unit constituted of two keys are of limited number, those key units as simplified codes should correspond to literal units of relatively high frequencies in use.

Since the simplified code key units contain much less letters as compared with their corresponding literal units, and their corresponding literal units are of relatively high frequencies in use, therefore, the use of these simplified codes will greatly improve the input speed.

The present invention may also provide certain key units to function as simplified codes for the days in a week or months in a year, for example, taking an arbitrary alphabetic key to associate with seven numeric keys respectively to constitute the key units for the days in a week corresponding to Monday, Tuesday, Wednesday, Thursday, Friday, Saturday, and Sunday.

It should be particularly pointed out that the scheme of the simplified code key units of two-key combinations and the upper case alphabetic keys being used as affix keys can also be adopted in normal input mode.

The key units of the present invention may also correspond to literal units of nonalphabetic writings. For example ",", ".", "/", ";", "''", "[", "]" or other punctuation keys can be specified to correspond to the keys of radicals or strokes or roots of Chinese characters, and their combinations can constitute key units corresponding to literal units in Chinese.

In consideration that some of the successive input of certain punctuation keys scarcely or never occur in the input of normal literal information, the key units constituted of them are not likely to cause errors for the input processing of literal information.

If it is further stipulated in the system that this kind of key unit should contain no less than a certain number of keys, for example, at least two or three punctuation keys may constitute a key unit, then the input mode of these key units can be more preferably distinguished from the normal mode or other modes.

As an embodiment, we will describe in detail the correspondence of the punctuation keys with the radicals of the Chinese characters.

Since inputting Chinese characters is rather difficult and complicated, and there are Chinese characters in many Asian writings, therefore, the solution of inputting Chinese characters is of great influence and significance. There have been several preferred methods for inputting Chinese characters, but none of these methods or keyboards is deemed to be perfect. Using any one of these keyboards or input methods we always discover that certain Chinese characters are impossible to be input with this keyboard or method. The above situation may be encountered in the cases of pure Chinese character input, or mixed input of writings having other letters and the Chinese characters, for example, Japanese and Korean. At that time, if we stop to look into a dictionary, it will be very inconvenient. Therefore, if we can use the combinations of the punctuation keys or other keys for concurrent retrieval processing of the Chinese dictionary, then the operating efficiency can be improved.

For example, if ",", ".", "/", ";", and "''" are used respectively to correspond to the five strokes "-" "|" "∕" "\" and "Z" of the Chinese characters, then, the composite keys of these punctuation keys may correspond to the Chinese characters. The input of such a key unit implies the input of a Chinese character, thereby, the above mentioned problem can be solved effectively, for example, the corresponding key unit for the Chinese character"—" is ", /.;".

The correspondence between the key units of the present invention and literal units can also be as follows:

The key unit corresponding to a literal unit is composed of the corresponding keys of letters selected from the literal unit, e.g. word, according to a specified order, for example, the keys corresponding to the first, third, fifth, seventh, . . . , and the last letters of a literal unit, or the first, second, fourth, sixth, . . . , and the last letters, or the first, second, third, fifth, . . . , and the last letters or letters in other orders can be selected to constitute the key unit for that literal unit.

For example, the corresponding key units for "English" can be "Egih" or "Enish" or "Engih".

BRIEF DESCRIPTION OF THE PREFERRED EMBODIMENT

A preferred embodiment for inputting English of the present invention is disclosed as follows:

The present embodiment allows consistent inputting with high efficiency mode and normal mode, its apparatus as shown in FIG. 1, comprises keyboard 1, I/O interface means 2, computer 3, determination processing means 4, key unit means 5, literal unit library 6, monitor 7, output means 8, and synonym indicating means (not shown); wherein, the determination processing unit further comprises input mode determination module 41, terminator key determination module 42, and synonym selecting module 43. Module 41 further comprises input mode automatic determination submodule and non-automatic determination submodule.

The keyboard of the present embodiment reserves the arrangement of standard keyboard.

The correspondence between the basic key units of the present embodiment and the literal units is as follows: the keys corresponding to the vowels and semivowel in a literal unit default in its corresponding key units.

In addition to the defaulting of the keys corresponding to vowels and semivowel of the corresponding literal units in the key units, the keys corresponding to a portion of the consonants of the corresponding literal units may also default in the key unit, the more the consonants default the more possibility and number of synonyms may occur, synonyms are relatively easier to occur in short words than in long words.

The space bar is used as the terminator key of each key unit, in addition, the keys "a", "e", "i", "o", "u" and "y" can also be used as terminator keys, when "a", "e", "i", "o", "u" and "ysp" are used as terminator keys, it is possible to reduce the synonyms.

The affix keys may concurrently be used as terminator keys.

The high frequency word key may also concurrently be used as terminator keys.

The space bar is used as the mode converting switch key: where the space bar is stricken after the terminator key of a key unit, the input mode is converted to normal mode, until an indicator, e.g., punctuations or space, of the terminating of a literal unit appears, the input mode, then is converted to high efficiency mode again.

The numeric keys "1", "2", "3", "4", "5", "6", "7", "8", "9" and "0" are used as the ten high frequency word keys "on", "that", "in", "a", "the", "of", "and", "to", "for", and "be".

An alphabetic key plus a numeric key correspond to a word, as shown in Table 2.

An alphabetic key plus one of the "⊔", ",", ".", "/", and ";" correspond to a word respectively, as shown in Table 3.

When synonyms occur, the synonym indicating means prompts the operator with sounding.

Synonym selection can be done by watching the prompt on the screen and striking the appropriate numeric key.

Synonym selection can be done by supplementing a portion or all of the defaulted keys of the corresponding key unit for a literal unit.

The key "," is used as the synonym selection key where there is no key that can be used for synonym selection, for example:

The key unit "bcde" corresponds to literal units: 1. "becod"; 2. beceod; 3. becd, if "becd" is to be selected, the key "3" can be striken, but in blind selecting, there are still synonyms when "e" is keyed in, then, we will find selection can not be done, at that time, the key "," can be striken to select the literal unit "becd".

The space bar can be used as the first position synonym selection key to select the literal unit arranged at the first position of the synonyms.

A portion of the upper case alphabetic keys used as the prefix and suffix keys, the correspondence is shown in FIG. 3.

Where the key units of the present embodiment correspond to literal units of phrases, the key unit corresponding to that literal unit can be constituted by sequentially taking the keys corresponding to the first consonant of each of the constituent words and taking the key corresponding to the first vowel of the last word of the phrase as the terminator key. When synonyms occur in inputting phrases, the regulations of synonym selection are the same as mentioned above.

The foregoing embodiment and specification described the inputting of English, in fact, the present invention is adaptable to any alphabetic writings, persons in the art can easily embody the present invention on various languages.

While what is disclosed by the present invention is an apparatus, wherein the correspondence between the key units and the literal units gives, in fact, also a corresponding input method. Once the correspondence between the key units and the literal units of the present invention and the literal units is comprehended, the method employing the present invention for inputting a literal unit by the inputting of its corresponding key unit is naturally comprehended, that is to say, the present invention has disclosed an input method at the same time.

The present invention is applicable on various key boards, i.e. both keyboards reserving the traditional arrangement and fingering of keys and special keyboard.

EFFECTS OF THE INVENTION

The advantages of the present invention reside in: the principles of the present invention are applicable to multiple languages, it is of strict rules, it is easy to operate and learn, and it has greatly improved the input speed.

The present invention processes synonym selection by supplementing defaulted keys, it is not necessary to watch the prompting of the screen, thereby, synonym selection can be done with blind typing.

Certain keys are specifically defaulted in the key units of the present invention, thereby, the present invention provides possibilities for defining new functions for those keys, while the definitions of those function keys, in turn, further improve greatly the input speed.

Another advantage of the present invention resides in that the implementing effects are preferable irrespective of the level of comprehension of the specific languages of the operator, and that the present invention has taken into consideration the applicability for both inputting with listening and inputting with watching.

The vowel keys with many variations and vulnerability to errors are omitted in the input process of the present invention, so as the error rate is reduced at the same time with the improving of input efficiency.

Furthermore, the correspondence between the key units of the present invention and the literal units is of another significance. Since the present invention allows to input a portion of the characters of a literal unit while omitting the other portion, therefore, the present invention can be used as a fuzzy dictionary, since the scheme of the present invention omits the vowels which are vulnerable to errors and confusing, so that we can find the desired words through the system apparatus of the present invention in cases of forgetting the exact spelling of certain words.

What is claimed is:

1. A high efficiency input processing apparatus for alphabetic writings, comprising:

a literal unit library for storing literal units containing characters and combinations of characters, a literal unit in said literal unit library corresponding to a key unit which is composed of a set of keys in accordance with a certain order on a keyboard, and which defaults the keys corresponding to a portion of characters of said literal unit;

determination processing means including a key unit termination determination module for determining whether a signal from a key unit is terminated, and a synonym selection module for determining and selecting a unique literal unit where said key unit corresponds to more than one of said literal units in said literal unit library; and key unit means for receiving a signal of each said key unit from said keyboard and retrieving the corresponding literal unit from said literal unit library according to the key unit entered.

2. A high efficiency input processing apparatus for alphabetic writings according to claim 1, wherein the key unit corresponding to a literal unit in said literal unit library defaults the keys corresponding to a portion of certain specific characters in said literal unit; and said key unit including a key indicating the termination of said key unit being used by said key unit termination determination module to determine whether said key unit is terminated.

3. A high efficiency input processing apparatus for alphabetic writings according to claim 2, wherein the key unit corresponding to a literal unit in said literal unit library defaults the keys corresponding to a portion of vowels and semivowels in said literal unit.

4. A high efficiency input processing apparatus for alphabetic writings according to claim 2, wherein the key unit corresponding to a literal unit in said literal unit library defaults the keys corresponding to all of the vowels and semivowels in said literal unit.

5. A high efficiency input processing apparatus for alphabetic writings according to claim 3, wherein the key unit corresponding to a literal unit is composed of the keys on said keyboard corresponding to first consonants of a portion of syllables.

6. A high efficiency input processing apparatus for alphabetic writings according to claim 4, wherein the key unit corresponding to a literal unit is composed of the keys on said keyboard corresponding to the first consonants of all of the syllables.

7. A high efficiency input processing apparatus for alphabetic writings according to claim 3, wherein the key unit corresponding to a literal unit is composed of the keys on said keyboard corresponding to the consonants preceding a portion of the vowels of said literal unit in said literal unit library.

8. A high efficiency input processing apparatus for alphabetic writings according to claim 4, wherein the key unit corresponding to a literal unit is composed of the keys on said keyboard corresponding to the consonants preceding all of the vowels of said literal unit in said literal unit library.

9. A high efficiency input processing apparatus for alphabetic writings according to claim 3, wherein if an ordered combination of the keys on said keyboard including a terminating indicator key corresponds to more than one literal unit in said literal unit library, then the key unit uniquely corresponding to one of these literal units is the ordered combination of the keys plus one of the following keys: the keys corresponding to a portion of the characters of the literal unit defaulting in the ordered combination of the keys, the keys corresponding to all of the characters of the literal unit defaulting in the ordered combination of the keys, the numeric keys, the space bar, the punctuation keys, the upper case alphabetic keys.

10. A high efficiency input processing apparatus for alphabetic writings according to claim 1, wherein some specific keys on said keyboard are defined as function keys including vowel keys, the space bar, the punctuation keys, the upper case alphabetic keys, the numeric keys and specific consonant keys.

11. A high efficiency input processing apparatus for alphabetic writings according to claim 1, wherein the key units composed, in certain order, of an alphabetic key and one of the function keys are used as simplified codes of some of the literal units in said literal unit library corresponding to those literal units.

12. A high efficiency input processing apparatus for alphabetic writings according to claim 1, wherein the key units composed, in certain order, of any two of said function keys are used as simplified codes of some of the literal units in said literal unit library corresponding to those literal units.

13. A high efficiency input processing apparatus for alphabetic writings according to claim 1, wherein said determination processing means further comprises a mode determination module for determining which of the two possible input modes is being applied to input information from said keyboard, where said two possible input modes are a normal mode and a high efficiency mode.

14. A high efficiency input processing apparatus for alphabetic writings according to claim 13, wherein said mode determination module includes at least one non-automatic input mode determination sub-module for determining which of said two possible input modes is being applied according to a switch signal preceding the input of information.

15. A high efficiency input processing apparatus for alphabetic writings according to claim 13, wherein said mode determination module further includes an automatic input mode determination submodule which automatically determines that the information is being input in the high efficiency mode when the first several keys of the input information form a specific combination which scarcely appears in the first several letters of a word in a certain language, otherwise it is determined that the information is input in normal mode.

16. A high efficiency input processing apparatus for alphabetic writings according to claim 1, wherein ordered combinations of punctuation and symbol keys on said keyboard also constitute key units corresponding to the literal units in said literal unit library.

17. A high efficiency input processing apparatus for alphabetic writings according to any one of claims 1 to 16, further comprises keyboard and computer means for controlling the operation of an system including a output device and the monitor.

18. A correspondence method between literal units and key units, characterized in that as compared with the literal unit, a portion of characters of the literal unit default in the key unit corresponding to said literal unit.

19. A correspondence method between literal units and key units according to claim 18, characterized in that as compared with the literal unit, a portion of certain specific characters of the literal unit default in the key unit corresponding to this literal unit.

20. A correspondence method between literal units and key units according to claim 18, characterized in that as compared with the literal unit, all of certain specific characters of the literal unit default in the key unit corresponding to this literal unit.

21. A correspondence method between literal units and key units according to claim 19, characterized in that as compared with the literal unit, a portion of the vowels and semivowels in the literal unit default in the key unit corresponding to this literal unit.

22. A correspondence method between literal units and key units according to claim 20, characterized in that as compared with the literal unit, all of the vowels and semivowels in the literal unit default in the key unit corresponding to this literal unit.

23. A correspondence method between literal units and key units according to claim 21, characterized in that as compared with the literal unit, a portion of the consonants of the literal unit further default in the key unit corresponding to this literal unit.

24. A correspondence method between literal units and key units according to claim 23, characterized in that as compared with the literal unit, consonants other than the first consonant in a portion of the syllables of the literal unit default in the key unit corresponding to this literal unit.

25. A correspondence method between literal units and key units according to claim 23, characterized in that as compared with the literal unit, consonants other than the first consonants in all of the syllables of the literal unit default in the key unit corresponding to this literal unit.

26. A correspondence method between literal units and key units according to claim 23, characterized in that as compared with the literal unit, consonants other than the consonants preceding a portion of the vowels in the literal unit default in the key unit corresponding to this literal unit.

27. A correspondence method between literal units and key units according to claim 23, characterized in that as compared with the literal unit, consonants other than the consonants preceding all of the vowels in the literal unit default in the key unit corresponding to this literal unit.

28. A correspondence method between literal units and key units according to claim 18, characterized in that as compared with the literal unit, characters at certain specific positions of the literal unit default in the key unit corresponding to this literal unit.

29. A correspondence method between literal units and key units according to claim 21, characterized in that when a literal unit represents more than one word of text, the key unit corresponding thereto includes at least the first consonants of a portion of the words of this literal unit.

30. A correspondence method between literal units and key units according to claim 22, characterized in that when a literal unit represents more than one word of text, the key unit corresponding thereto includes at least the first consonants of all of the words of this literal unit.

31. A correspondence method between literal units and key units according to claim 18, characterized in that when a key unit corresponds to more than one literal unit, the key unit uniquely corresponding to one of those literal units comprises the key unit plus a portion of the default characters of this literal unit.

32. A correspondence method between literal units and key units according to claim 18, characterized in that when a key unit corresponds to more than one literal unit, the key unit uniquely corresponding to one of those literal units comprises the key unit plus all of the default characters of this literal unit.

33. A method of determining a high efficiency input method in which some specific characters in words are defaulted during input, characterized in that a determination of whether information is input with the high efficiency input method depends upon whether a combination of the first several characters input belong to a specific combination of characters which are known not to appear together to form a word.

34. A method of determining a high efficiency input method as claimed in claim 33, characterized in that determining whether the information was input with said high efficiency input method according to whether the combination of the first several characters input being part of the specific combinations of characters scarcely appearing in the words of the language input, and if so, then it is determined that the information was input with said high efficiency input method.

* * * * *